(12) United States Patent
Finkle

(10) Patent No.: US 8,978,238 B2
(45) Date of Patent: Mar. 17, 2015

(54) APPARATUS AND METHOD FOR EFFICIENT STATOR WINDINGS TERMINATION

(71) Applicant: Louis J. Finkle, Lakewood, CA (US)

(72) Inventor: Louis J. Finkle, Lakewood, CA (US)

(*) Notice: Subject to any disclaimer, the term of this patent is extended or adjusted under 35 U.S.C. 154(b) by 214 days.

(21) Appl. No.: 13/771,624

(22) Filed: Feb. 20, 2013

(65) Prior Publication Data

US 2013/0212868 A1  Aug. 22, 2013

Related U.S. Application Data

(60) Provisional application No. 61/600,787, filed on Feb. 20, 2012.

(51) Int. Cl.
| | | |
|---|---|---|
| *H02K 15/00* | (2006.01) |
| *H01R 43/06* | (2006.01) |
| *H01R 43/10* | (2006.01) |
| *B23P 19/00* | (2006.01) |
| *H02K 15/085* | (2006.01) |
| *H02K 3/50* | (2006.01) |

(52) U.S. Cl.
CPC ............... *H02K 15/085* (2013.01); *H02K 3/50* (2013.01); *H02K 15/0075* (2013.01); *H02K 2203/09* (2013.01)
USPC .................... 29/596; 29/597; 29/598; 29/732

(58) Field of Classification Search
USPC ............................ 29/596, 597, 598, 732, 735
See application file for complete search history.

(56) References Cited

U.S. PATENT DOCUMENTS

| | | | | |
|---|---|---|---|---|
| 5,090,108 | A | * | 2/1992 | Banner et al. .................... 29/596 |
| 5,855,058 | A | * | 1/1999 | Lewchenko et al. ............ 29/735 |
| 5,950,300 | A | * | 9/1999 | Newman .......................... 29/596 |
| 6,023,837 | A | * | 2/2000 | Finn ............................. 29/566.1 |
| 6,058,595 | A | * | 5/2000 | Lewchenko et al. ............ 29/597 |
| 6,092,276 | A | * | 7/2000 | Beakes et al. .................... 29/596 |
| 6,732,970 | B2 | * | 5/2004 | Dolgas et al. ............... 242/432.4 |
| 6,758,429 | B2 | * | 7/2004 | Stratico et al. .............. 242/432.4 |
| 7,093,344 | B2 | * | 8/2006 | Miya et al. ....................... 29/596 |
| 7,380,335 | B2 | * | 6/2008 | Hashimoto et al. ............. 29/732 |
| 7,536,770 | B2 | * | 5/2009 | Yamazaki et al. ............... 29/596 |
| 8,230,585 | B2 | * | 7/2012 | Ponzio et al. .................... 29/605 |
| 2002/0079399 | A1 | * | 6/2002 | Dolgas et al. .............. 242/433.1 |
| 2003/0192981 | A1 | * | 10/2003 | Ponzio et al. .............. 242/433.4 |
| 2004/0056550 | A1 | * | 3/2004 | Grundl et al. ................. 310/187 |

FOREIGN PATENT DOCUMENTS

JP   2011-234503   11/2011

* cited by examiner

*Primary Examiner* — David Angwin
(74) *Attorney, Agent, or Firm* — Kenneth L. Green

(57) ABSTRACT

A method and apparatus for terminating stator windings. The apparatus includes stator winding termination disks having "U" shaped winding mouths for each group of stator winding ends. After winding the stator, the stator winding termination disks are laid over the termination end of the stator, the unterminated stator windings for one phase of the stator are placed into the "U" shaped winding mouths, the "U" shaped winding mouths are crimped over the unterminated stator windings, and pressure and heat are applied to melt insulation on the unterminated stator winding ends and form an electrical connection between the stator winding termination disks and stator windings for each phase of the stator and for common.

12 Claims, 3 Drawing Sheets

APPARATUS AND METHOD FOR EFFICIENT STATOR WINDINGS TERMINATION

CROSS-REFERENCE TO RELATED APPLICATIONS

The present application claims the priority of U.S. Patent Provisional Application Ser. No. 61/600,787 filed Feb. 20, 2012, which application is incorporated in its entirety herein by reference.

BACKGROUND OF THE INVENTION

The present invention relates to the manufacture of electric motors and in particular to the termination of stator windings.

Manufacturing stators is labor intensive because stator winds are individually connected to power sources for each phase. Such labor intensive methods add cost to the manufacture of electric motors.

Further, manually formed stator winding connections often result in unequal stator wire lengths which results in current variations, phase imbalances, and harmonics under high current load.

BRIEF SUMMARY OF THE INVENTION

The present invention addresses the above and other needs by providing a method and apparatus for terminating stator windings. The apparatus includes stator winding termination disks having "U" shaped winding mouths for each group of stator winding ends. The stator winding termination disks are laid over the termination end of the stator, the unterminated stator windings for one phase of the stator are placed into the "U" shaped winding mouths, the "U" shaped winding mouths are crimped over the unterminated stator windings, and pressure and heat are applied to melt insulation on the unterminated stator winding ends and form an electrical connection between the stator winding termination disks and stator windings for each phase of the stator.

In accordance with one aspect of the invention, there are provided automated methods for constructing stator winding terminations. The labor intensive aspects of electric motor construction are thus reduced and as a result costs are reduced.

In accordance with another aspect of the invention, there is provided a method for forming consistent stator winding terminations to a common (or yoke) termination disk using the same methods as used for each stator winding termination disk.

In accordance with yet another aspect of the invention, there is provided a method for forming consistent stator winding terminations, resulting in equalized current, and reducing phase imbalances and harmonics under high current load.

In accordance with still another aspect of the invention, there are provided stator leads connected inward to the center, reducing the current path to each other, further reducing imbalances and resistance.

In accordance with yet another aspect of the invention, there is provided a method for layering the basic four stator terminal connections, the common or Y connection, and the three phases, any number of phases may also be added, including Delta connection.

In accordance with yet another aspect of the invention, there is provided a stator winding termination crimping device centered within the diameter of the stator, access to the underside of fixture is possible for fixturing.

In accordance with yet another aspect of the invention, there is provided a method for melting and displacing insulative coatings during crimping and heating in one operation, for example by resistance heating the stator winding wire. The insulation is otherwise difficult to remove without abrasive or mechanical action.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
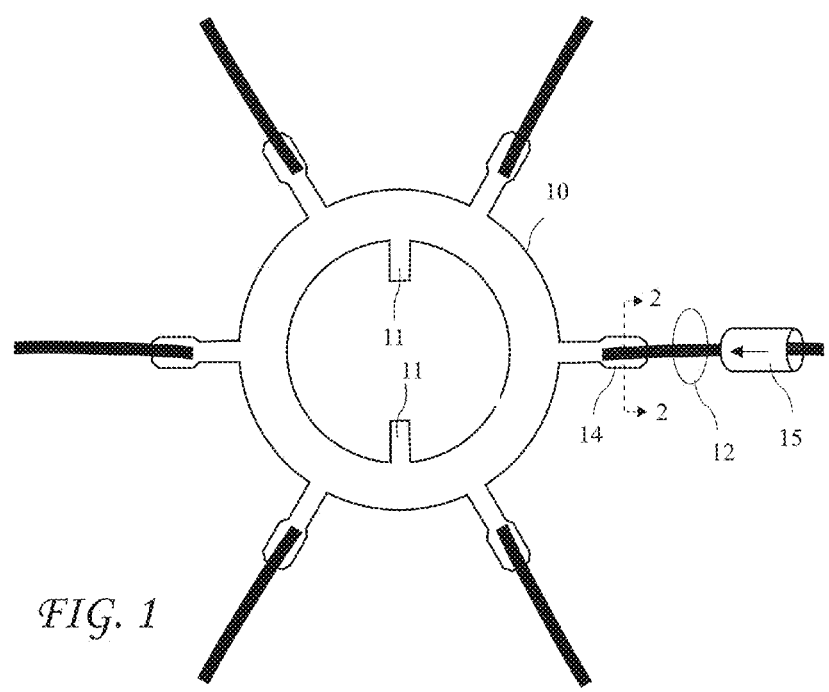
FIG. 1 shows a stator winding termination disk according to the present invention and eight stator winding ends.

A stator winding termination disk 10 according to the present invention and six first stator winding ends 12 are shown in FIG. 1. The first stator winding ends 12 are resting in uniformly angularly spaced apart winding mouths 14 of the stator winding termination disk 10. An electrically insulating sleeve 15 is later positioned over the terminated stator winding ends 12. At least one tab 11 is provided for connection to a three phase power source, and preferably two 180 degree spaces apart tabs 11 are provided to better balance current paths. The tabs 11 may use any common electrical termination method, including crimping, welding, soldering, a screw termination, and the like.

Figures 2A, 2B, 2C, 3:
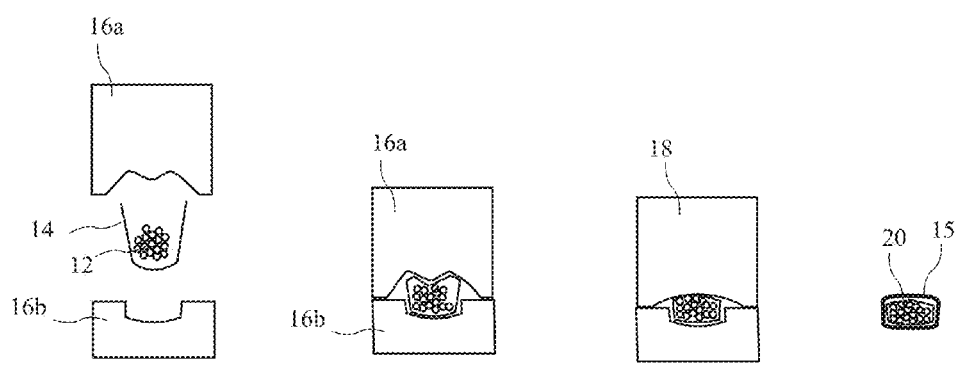
FIG. 2A shows a cross-sectional view of a stator winding in a winding mouth according to the present invention, taken along line 2-2 of FIG. 1 before crimping.
FIG. 2B shows a cross-sectional view of a stator winding in the winding mouth according to the present invention, taken along line 2-2 of FIG. 1 after crimping.
FIG. 2C shows a cross-sectional view of a stator winding in the winding mouth according to the present invention, taken along line 2-2 of FIG. 1 after second crimping and heat stripping
FIG. 3 shows a crimped and stripped winding end.

A cross-sectional view of the first stator winding ends 12 in the winding mouth 14 according to the present invention, taken along line 2-2 of FIG. 1 before crimping, is shown in FIG. 2A. A crimping die pair 16a and 16b reside above and below the first stator winding ends 12 and winding mouth 14. The crimping die pair 16a and 16b are preferably part of a crimping turret including a pair of dies for each stator winding and crimping all of the stator winding (for a single phase) in a single step.

A cross-sectional view of the first stator winding ends 12 in the winding mouth 14, taken along line 2-2 of FIG. 1, after crimping, is shown in FIG. 2B. The crimping die 16a has been lowered against the crimping die 16b and the edges of the winding mouth 14 have been folded over the first stator winding ends 12.

A cross-sectional view of the first stator winding end 12 in the winding mouth 14, taken along line 2-2 of FIG. 1, after second crimping and heat stripping, is shown in FIG. 2C. The second crimping step combined with heat melts the insulation on the first stator winding ends 12 and forms intimate contact between the first stator winding ends 12 and the stator winding termination disk 10. The second crimping is applied with sufficient force to push the melted insulation away from the crimped stator winding ends to provide the electrical connection between the stator winding ends and the stator winding termination disk 10. As with the first crimping step, all of the terminal wires (for a single phase) are completed in a single operation.

A crimped and stripped winding end 20 is shown competed in FIG. 3 with the insulating sleeve 15 over the crimped and stripped winding end 20.

Figure 4:
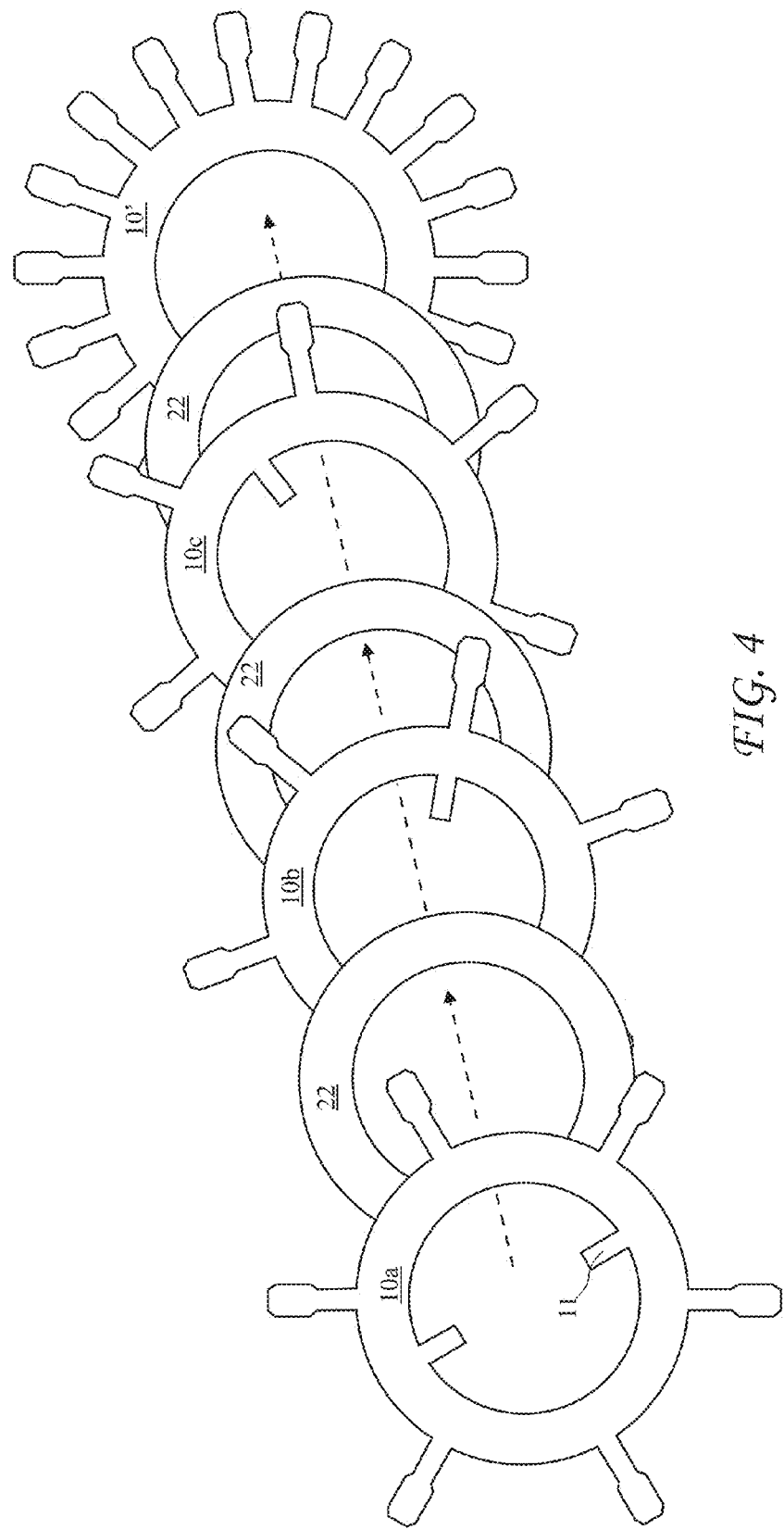
FIG. 4 shows a set of stator winding termination disks for a multi-phase motor.

An example of a stack of stator winding termination disks 10a, 10b, 10c, a common (or yoke) termination disk 10', and insulators 22, for a multi-phase motor are shown in FIG. 4. One of the stator winding termination disks 10a, 10b, or 10c is provided for each phase of the motor and the common terminal disk 10' for all three phases. The connection of the stator winding to each stator winding termination disk is performed sequentially. The insulators 22 insulate consecutive stator winding termination disks 10a, 10b, 10c, and 10'.

Figure 5:
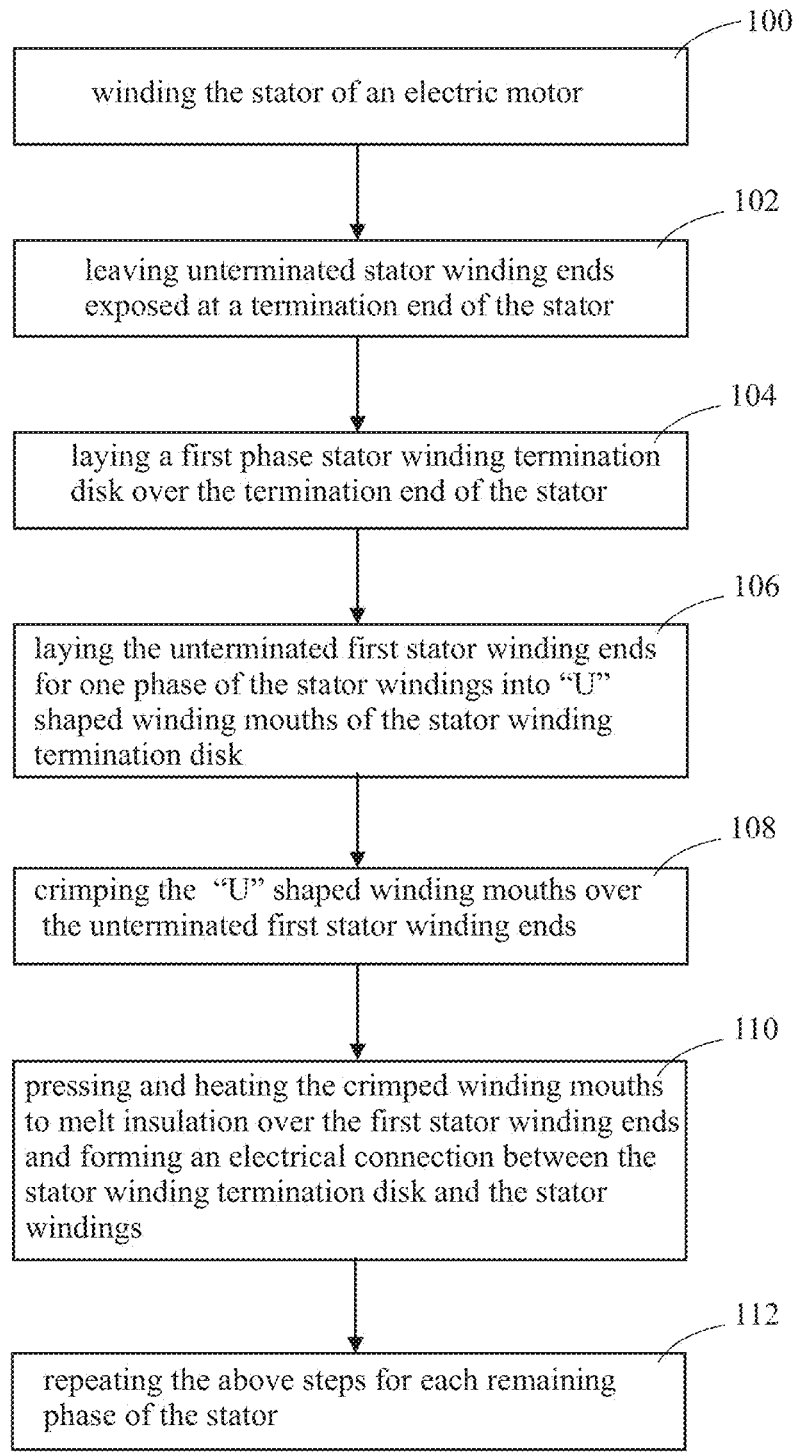
FIG. 5 describes a method according to the present invention.

A method for stator winding termination is described in FIG. 5. The method includes: winding the stator of a multi-phase electric motor, at step 100; leaving unterminated stator winding ends exposed at a termination end of the stator, at step 102; laying a first phase stator winding termination disk over the termination end of the stator, at step 104; laying the unterminated first stator winding ends for one phase of the stator windings into "U" shaped winding mouths of the stator winding termination disk, at step 106; crimping the "U" shaped winding mouths over the unterminated first stator winding ends, at step 108; pressing and heating the crimped winding mouths to melt insulation over the first stator winding ends and forming an electrical connection between the stator winding termination disk, at step 110; and the stator windings; and repeating the above steps for each remaining phase of the stator, at step 112.

The method may further include: laying a common stator winding termination disk over the termination end of the stator; laying the unterminated first stator winding ends for one phase of the stator windings into "U" shaped winding mouths of the stator winding termination disk; crimping the "U" shaped winding mouths over the unterminated first stator winding ends; and pressing and heating the crimped winding mouths to melt insulation over the first stator winding ends and form an electrical connection between the stator winding termination disk and the stator windings.

Insulating sleeves may further be placed over the unterminated stator winding ends before attachment to the disks, and the sleeves may be positioned over the terminated stator winding ends after attachment to the disks. Electrically insulating disks are further placed between consecutive disks. The stator winding termination disks are preferably adhering to the stator.

While the invention herein disclosed has been described by means of specific embodiments and applications thereof, numerous modifications and variations could be made thereto by those skilled in the art without departing from the scope of the invention set forth in the claims.

I claim:

1. A method for terminating stator windings, the method comprising:
    winding a stator of an electric motor to create stator windings for each phase of the electric motor, including stator windings for a first phase of the electric motor;
    leaving unterminated stator winding ends of the stator windings exposed at a termination end of the stator;
    laying a first phase stator winding termination disk over the termination end of the stator;
    laying unterminated first stator winding ends for the first phase of the stator windings into angularly spaced apart "U" shaped winding mouths of the stator winding termination disk;
    crimping the "U" shaped winding mouths over the unterminated first stator winding ends for the first phase of the stator windings to obtain crimped first stator winding ends for the first phase of the stator windings;
    pressing and heating the crimped winding mouths to melt insulation from the crimped first stator winding ends for the first phase of the stator windings forming an electrical connection between the first stator winding termination disk and the stator windings for the first phase of the electric motor; and
    repeating the above steps for each remaining phase of the electric motor.

2. The method of claim 1, further including positioning electrical insulators between consecutive stator winding termination disks to electrically insulate each stator winding termination disks from adjacent stator winding termination disks.

3. The method of claim 2, wherein leaving unterminated stator winding ends of the stator windings exposed at a termination end of the stator comprises leaving the unterminated first stator winding ends of the stator windings exposed at a termination end of the stator and leaving unterminated second stator winding ends opposite the unterminated first stator winding ends of the stator windings exposed at a termination end of the stator, and further including:
    laying a common stator winding termination disk over the termination end of the stator;
    laying the unterminated second stator winding ends for all phases of the stator windings into "U" shaped winding mouths of the common stator winding termination disk;
    crimping the "U" shaped winding mouths over the unterminated second stator winding ends to create crimped second stator winding ends; and
    pressing and heating the crimped winding mouths to melt insulation over the crimped second stator winding ends forming an electrical connection between the common stator winding termination disk and the stator windings.

4. The method of claim 3, further including positioning additional electrical insulators between the common stator winding termination disk and any adjacent stator winding termination disks.

5. The method of claim 4, further including positioning electrically insulating sleeves over the terminated stator winding ends.

6. The method of claim 5, further including connecting leads for each phase of the electric motor to each corresponding stator winding termination disk.

7. The method of claim 6, further including connecting two leads for each phase to each corresponding stator winding termination disk at 180 degree spaced apart positions on each corresponding stator winding termination disk.

8. The method of claim 7, wherein laying the unterminated first stator winding ends for one phase of the stator windings into "U" shaped winding mouths of the stator winding termination disk comprises laying the unterminated first stator winding ends for one phase of the stator windings into uniformly angularly spaced apart "U" shaped winding mouths.

9. The method of claim 8, further including adhering the stator winding termination disks to the stator.

10. The method of claim 9, wherein the motor is a three phase motor and the stator winding termination disks consist of three stator winding termination disks.

11. A method for terminating stator windings, the method comprising:
  winding a stator of a three phase electric motor to create stator windings for each phase of the electric motor, including stator windings for a first phase of the electric motor;
  leaving unterminated first stator winding ends of the stator windings exposed at a termination end of the stator and leaving unterminated second stator winding ends opposite the unterminated first stator winding ends of the stator windings exposed at a termination end of the stator;
  laying a common stator winding termination disk over the termination end of the stator;
  laying the unterminated second stator winding ends for all phases of the stator windings into "U" shaped winding mouths of the common stator winding termination disk;
  crimping the "U" shaped winding mouths over the unterminated second stator winding ends to create crimped second stator winding ends; and
  pressing and heating the crimped winding mouths to melt insulation over the crimped second stator winding ends forming an electrical connection between the common stator winding termination disk and the stator windings;
  positioning electrically insulating sleeves over the terminated second stator winding ends;
  for each phase of the three phase electric motor:
    laying a first phase stator winding termination disk over the termination end of the stator;
    laying unterminated first stator winding ends for the first phase of the stator windings into angularly spaced apart "U" shaped winding mouths of the stator winding termination disk;
    crimping the "U" shaped winding mouths over the unterminated first stator winding ends for the first phase of the stator windings to obtain crimped first stator winding ends for the first phase of the stator windings;
    pressing and heating the crimped winding mouths to melt insulation from the crimped first stator winding ends for the first phase of the stator windings forming an electrical connection between the first stator winding termination disk and the stator windings for the first phase of the electric motor;
    positioning electrically insulating sleeves over the terminated first stator winding ends; and
    connecting a lead for the first phase of the electric motor to the first stator winding termination disk;
  repeating the above steps for second and third phases of the electric motor; and
  adhering the common stator winding termination disk and the stator winding termination disks to the stator.

12. A method for terminating stator windings, the method comprising:
  winding a stator of a three phase electric motor to create stator windings for each phase of the electric motor, including stator windings for a first phase of the electric motor;
  leaving unterminated first stator winding ends of the stator windings exposed at a termination end of the stator and leaving unterminated second stator winding ends opposite the unterminated first stator winding ends of the stator windings exposed at a termination end of the stator;
  laying a common stator winding termination disk over the termination end of the stator;
  laying the unterminated second stator winding ends for all phases of the stator windings into uniformly angularly spaced apart "U" shaped winding mouths of the common stator winding termination disk;
  crimping the "U" shaped winding mouths over the unterminated second stator winding ends to create crimped second stator winding ends; and
  pressing and heating the crimped winding mouths to melt insulation over the crimped second stator winding ends forming an electrical connection between the common stator winding termination disk and the stator windings;
  positioning electrically insulating sleeves over the terminated second stator winding ends;
  for each phase of the three phase electric motor:
    laying a first phase stator winding termination disk over the termination end of the stator;
    laying unterminated first stator winding ends for the first phase of the stator windings into uniformly angularly spaced apart "U" shaped winding mouths of the stator winding termination disk;
    crimping the "U" shaped winding mouths over the unterminated first stator winding ends for the first phase of the stator windings to obtain crimped first stator winding ends for the first phase of the stator windings;
    pressing and heating the crimped winding mouths to melt insulation from the crimped first stator winding ends for the first phase of the stator windings forming an electrical connection between the first stator winding termination disk and the stator windings for the first phase of the electric motor;
    positioning electrically insulating sleeves over the terminated first stator winding ends;
    connecting two leads to the first stator winding termination disk at 180 degree spaced apart positions; and
    repeating the above steps for second and third phases of the electric motor; and
  attaching the common stator winding termination disk and the stator winding termination disks to the stator.

\* \* \* \* \*